(12) United States Patent
Ishikawa et al.

(10) Patent No.: US 7,181,911 B2
(45) Date of Patent: Feb. 27, 2007

(54) PLUNGER TYPE MASTER CYLINDER

(75) Inventors: Kazuyoshi Ishikawa, Higashi-Matsuyama (JP); Ichiro Ishiwata, Higashi-Matsuyama (JP); Kazuhisa Taira, Higashi-Matsuyama (JP); Tetsuya Masuda, Higashi-Matsuyama (JP); Minoru Miyahara, Higashi-Matsuyama (JP); Kunio Yanagi, Higashi-Matsuyama (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 10/550,168

(22) PCT Filed: Apr. 21, 2004

(86) PCT No.: PCT/JP2004/005725

§ 371 (c)(1),
(2), (4) Date: Sep. 20, 2005

(87) PCT Pub. No.: WO2004/094208

PCT Pub. Date: Nov. 4, 2004

(65) Prior Publication Data

US 2006/0179836 A1  Aug. 17, 2006

(30) Foreign Application Priority Data

| Apr. 23, 2003 | (JP) | ............................. 2003-118943 |
| Apr. 23, 2003 | (JP) | ............................. 2003-118944 |
| Apr. 23, 2003 | (JP) | ............................. 2003-118945 |

(51) Int. Cl.
*B60T 11/236* (2006.01)
*B60T 11/20* (2006.01)

(52) U.S. Cl. ......................... 60/588; 60/585

(58) Field of Classification Search .................. 60/562, 60/585, 586, 588
See application file for complete search history.

(56) References Cited

U.S. PATENT DOCUMENTS

| 6,272,858 B1 * | 8/2001 | Takano et al. ................ 60/588 |
| 6,378,304 B1 * | 4/2002 | Angione ...................... 60/588 |
| 6,581,380 B2 * | 6/2003 | Dangel et al. ................ 60/588 |
| 7,055,322 B2 * | 6/2006 | Yasuda et al. ................ 60/588 |

(Continued)

FOREIGN PATENT DOCUMENTS

DE  195 20 682 A1  8/1996

(Continued)

*Primary Examiner*—Thomas E. Lazo
(74) *Attorney, Agent, or Firm*—Frommer Lawrence & Haug LLP; Ronald R. Santucci

(57) ABSTRACT

To provide a plunger type master cylinder capable of reducing invalid stroke and preventing residual pressure without impairing durability of a seal ling (70). A piston (91) of the master cylinder has a recess (93) at its outer peripheral surface and a relief port (900) in its recess (93). The seal ring (70) has a seal coupling part (70s) on the inner periphery of the distal end part of an inner peripheral lip (701). The seal coupling part (70s) is located at the opening of the relief portion (900) on the piston (91) side when the brake is in a non-operating position. The distance between said seal coupling part (70s) and said relief port (900) is short. The seal ring (70) additionally has first and second projection parts (7006, 7002) on the inner peripheral surface of the inner peripheral lip (701). By this, a flow passage for working fluid can be obtained on the inner periphery side of the inner peripheral lip (701).

10 Claims, 5 Drawing Sheets

U.S. PATENT DOCUMENTS 7,104,059 B2 *  9/2006  Tsubouchi et al. ............ 60/588

FOREIGN PATENT DOCUMENTS

| DE | 195 36 325 A  | 4/1997 |
| DE | 195 36 325 A1 | 4/1997 |
| DE | 199 46 415 A1 | 4/2000 |
| JP | 55-031662     | 3/1980 |
| JP | 01-208260     | 8/1989 |
| JP | 2-148863      | 12/1990 |
| JP | 2-149364      | 12/1990 |
| JP | 2000-108878   | 4/2000 |
| JP | 2001-146157   | 5/2001 |

* cited by examiner

PLUNGER TYPE MASTER CYLINDER

This application is a 371 of PCT/JP2004/005725 filed on Apr. 21, 2004, published on Nov. 4, 2004 under publication number WO 2004/094208 A1 which claims priority benefits from Japanese Patent Application Number 2003-118943 filed Apr. 23, 2003 and Japanese Patent Application Number 2003-118944 filed Apr. 23, 2003 and Japanese Patent Application Number 2003-118945 filed Apr. 23, 2003.

TECHNICAL FIELD

This invention relates to a plunger type master cylinder used in a hydraulic brake system for vehicles, and the like, and more particularly to the technique of a master cylinder suited for brake control (for example, automatic brake control for controlling the attitude of a vehicle, or traction control for controlling the braking force of a drive wheel at the time of acceleration of a vehicle, and the like) which is performed separately from the manual brake control made by a driver.

BACKGROUND ART

A plunger type master cylinder used for the purposes as mentioned above has a relief port formed in a piston capable of moving in an axial direction within a cylinder bore of a cylinder housing. It is said that a seal ring for opening and closing the relief port is high in durability.

As technical problems to be solved for such a plunger type master cylinder, firstly, there is such a problem as how to reduce the invalid stroke caused by braking operation and secondly, there is such a problem as how to prevent the residue of a brake fluid pressure (so-called residual pressure) in a fluid pressure chamber during non-operation of the brake. As a related art, there can be listed, for example, the Official Gazette of DE 19,536,325A1 (see especially its FIG. 1). In this related art, a technique for reducing the invalid stroke which belongs to the first-mentioned problem to be solved is disclosed, in which a piston (13) including a relief port (20) is provided at its tip part with a reduced-diameter part (40), and a seal ring (11) is arranged at the reduced-diameter part (40). As another related art, there can also be listed the Official Gazette of Japanese Patent Application Laid-Open No. 2000-108878 (see especially its FIG. 2). This related art also discloses a technique for reducing the first-mentioned invalid stroke, in which a piston (13) is provided with a control tapered-surface (86) which is formed on the outer peripheral surface of a piston (13) at the rear side of an opening part of a relief port (56). The inner periphery of a cup seal (46) can be sealed by utilizing this control tapered-surface (86). Moreover, Official Gazette of Japanese Patent Application Laid-Open No. 2001-146157 (see especially its FIG. 2) discloses a technique for preventing the second-mentioned residual pressure, in which a relief port (4c) is formed at a piston (4) and a safety hole (4e) is disposed at a rear side of the relief port, so that pressure in a fluid pressure chamber can positively be relieved through the safety hole.

PROBLEM TO BE SOLVED BY THE INVENTION

In the stage for developing the technique for solving the above-mentioned two problems, i.e., reduction of invalid stroke and prevention of residual pressure, the inventors have noticed that the usual plunger type master cylinders including the above-mentioned related arts have a certain common point. What is noticed by the inventors is a common point in positional relation between a piston and a seal ring for sealing its outer periphery. That is, when the master cylinder is in a non-operating position, at least the tip part of an inner peripheral lip of the seal ring is located at the front side of the relief port as viewed in the axial direction. In contrast, when the master cylinder is in an operating position, the inner peripheral lip of the seal ring is located at the rear side of the relief port. Therefore, when the master cylinder repeats the shifting motion between the non-operating position and the operating position, the inner peripheral lip of the seal ring, at least the tip part of the inner peripheral lip traverses both the second edge at the front side of the opening of the relief port and the first edge at the rear side of the opening of the relief port. The "front side" of the relief port refers, as viewed in the axial direction, to the side which is nearer to the fluid pressure chamber, and the rear side, to the side which is nearer to the opening of the cylinder bore, respectively.

The relief port which is formed at the piston, is a hole having a diameter, for example, of about 2 mm. The edge of the opening part of the relief port is somewhat square due to hole machining. Therefore, the repeated traversing motion across such an edge as just mentioned would result in deterioration of the lip of the seal ring, which is composed of rubber material, due to aging fatigue. This is liable to impair durability of the seal ring. Although it is a good idea to prevent the residual pressure by forming a safety hole at the piston, the hole machining applied to the piston is preferably reduced as much as possible.

It is, therefore, an object of the present invention to provide a plunger type master cylinder which is capable of solving the above-mentioned two problems, i.e., reduction of invalid stroke and prevention of residual pressure, without impairing durability of the seal ring.

It is another object of the present invention to provide a technique capable of effectively conducting the prevention of residual pressure, while reducing, as much as possible, hole machining applied to the piston.

Other objects of the present invention will become manifest from the following description.

DISCLOSURE OF THE INVENTION

The present invention adopts such an idea that the various problems of enhancement of durability of the seal ring, reduction of invalid stroke and prevention of residual pressure are effectively solved by arranging the inner peripheral lip of the seal ring and the relief port on the piston side in a predetermined positional relation. The fundamental features of this idea reside in the following features 1, 2 and 3, and also reside, as additional features, in the features 4 and 5 as later described.

feature 1. A recess is formed on an outer peripheral surface of the piston ranging, when axially viewed, at least from a second edge (edge on the side near the fluid pressure chamber side) of the opening of the relief port to a first edge (edge on the side remote from the fluid pressure chamber side), further ranging to an area away by a predetermined distance from the first edge of the opening of the relief port toward the first end part side, and further ranging over the entire length in a peripheral direction of the piston.

feature 2. The inner lip of the seal ring is smaller in diameter at a distal end part as a free end thereof than at a root part on the base part side, thereby the seal ring has a seal coupling part situated at an inner periphery of the distal end part of the inner lip which is small in diameter which is seal-coupled to an outer peripheral wall surface of the piston and adapted to seal-coupled to an outer peripheral wall surface of the piston, and moreover, a void for communicating the relief port with the communication passage together with the recess is formed between an inner periphery of the inner lip ranging from the seal coupling part to the root part.

feature 3. The seal coupling part of the distal end part of the inner lip of the seal ring is located at the opening part of the relief port on the side of the piston when the master cylinder is in a non-operating position.

Owing to the recess formed in the outer periphery of the piston under feature 1, and the seal coupling part of the seal ring and the void between the inner periphery of the inner lip and the outer peripheral wall surface of the piston under feature 2, the fluid pressure chamber can be communicated with the reservoir side when the master cylinder is in a non-operating position. Owing to the unique and characteristic arrangement of the seal coupling part (or the distal end part of the inner lip of the seal ring) when the master cylinder is in a non-operating position under feature 3, durability of the seal ring can be enhanced and invalid stroke can be reduced. Particularly, those features 1 through 3 are of great help to solve three problems without impairing the features which others have and by mutually cooperating.

Particularly, the distal end part of the inner lip of the seal ring is located in the opening of the relief port when the master cylinder is in a non-operating position. This means that the seal coupling part of the seal ring traverses only the edge on the side of the first edge of all the entire edge of the opening of the relief port in accordance with non-operation and operation of the master cylinder. Therefore, the repeat of non-operation and operation reduces the number of times for the seal coupling part to traverse the edge into a half. It can be expected that durability of the seal ring is enhanced to that extent.

The bore of the relief port (axial diameter of the opening) is, for example, about 2 mm. In contrast, the relative movement (axial distance) between the seal ring and the piston caused by operation of the master cylinder varies depending on how brake is actuated. However, this variation in relative movement is in the range from, for example, a few millimeters to 10 mm in quantity of axial stroke. Therefore, the seal coupling part of the seal ring is located at the outer periphery of the piston passing over the recess when the master cylinder is in a condition of normal operation, but the seal coupling part is sometimes located in the recess when the brake is actuated lightly.

The recess formed at the outer periphery of the piston ranges over the entire length in the peripheral direction of the piston but it ranges in a limited region in the vicinity of the relief port in the axial direction. Thus, the piston has enlarged-diameter parts which are each located in a front and a rear position of the recess. In a preferred embodiment, the both front and rear parts of the recess of the piston are guided by a piston guide part on the cylinder housing side. In case the piston guide part is arranged at the front side of the recess, the sealing force in the peripheral direction of the seal ring can effectively be uniformed because the piston guide part is in a position near the seal coupling part of the seal ring which is brought into the opening of the seal ring.

Since a void is formed between the inner periphery of the inner lip of the seal ring and the outer peripheral wall surface of the piston, the residual pressure can be released to the reservoir side through the void and the communication passage when the master cylinder is in a non-operating position. In a normal case, residual pressure can be prevented by this. However, it can be imagined that when the working fluid on the reservoir side is supplied to the wheel cylinder side of the brake device through the fluid pressure chamber under pump action when the automatic brake is in an operating position, the inner lip of the seal ring is oscillatingly deformed due to fluctuation of fluid pressure of the working fluid, etc. and the void which is turned out to be a passage, is reduced, thereby disabling to supply the fluid sufficiently. In order to effectively obtain such fluid supply property, in a preferred embodiment of the present invention, the seal ring further has the following feature(s) 4 and/or 5.

feature 4. The seal ring comprises a plurality of first projection parts formed on an inner peripheral surface of the inner lip between the root part and the seal coupling part and bulged from the inner peripheral surface of the inner lip toward the outer peripheral surface of the piston, and the first projection parts are spacedly arranged in the peripheral direction, thereby forming an axial flow passage between the first projection parts which are adjacent to each other in the peripheral direction.

feature 5. The seal ring is deformable such that the inner lip is oscillated radially inward and outward about the root part, the base part, the base part is provided at an inside surface on the side where the inner and outer lips extend with a swollen part for enlarging the axial thickness of the base part on the inner lip side compared with the outer lip side, and the center of oscillation of the inner lip is located in a position nearer to the second end part side in the axial direction than in a case where no swollen part is provided.

As a modified embodiment having the feature 4, the second projection parts are provided parallel to the first projection parts (projection parts are provided in two row between the root part and the seal coupling part). Owing to this arrangement, the void on the inner periphery side of the inner lip can more surely be obtained. Although the features 4 and 5 can individually effectively act in obtaining fluid supply property, an embodiment having both the features 4 and 5 is more preferable.

In the master cylinder of this invention, it is accepted that in order to attach the seal ring to the cylinder housing side, a slide ring is inserted in the inner periphery of the cylinder bore and one side of the seal ring is supported by one end of the slide ring. It is more preferable that an attachment groove for attaching the seal ring is provided directly to the inner peripheral wall surface of the cylinder bore of the cylinder housing. Owing to this arrangement, the number of component parts can be reduced, and the positional relation between the relief port on the piston side and the seal ring on the cylinder housing side can established with higher precision. The seal ring is disposed in the attachment groove with its base part sunk in the attachment groove and with the seal coupling part on the inner periphery of the distal end part of the inner peripheral lip allowed to project outward from the attachment groove.

The present invention can be applied not only to the tandem type but also to the single type. In case the present invention is applied to the tandem type, it can be applied to both of the primary side and the secondary side (i.e., to both side in the plunger type) or only to one of the primary side and the secondary side (i.e., to one side in the plunger type).

BEST MODE FOR CARRYING OUT THE INVENTION

Figure 1:
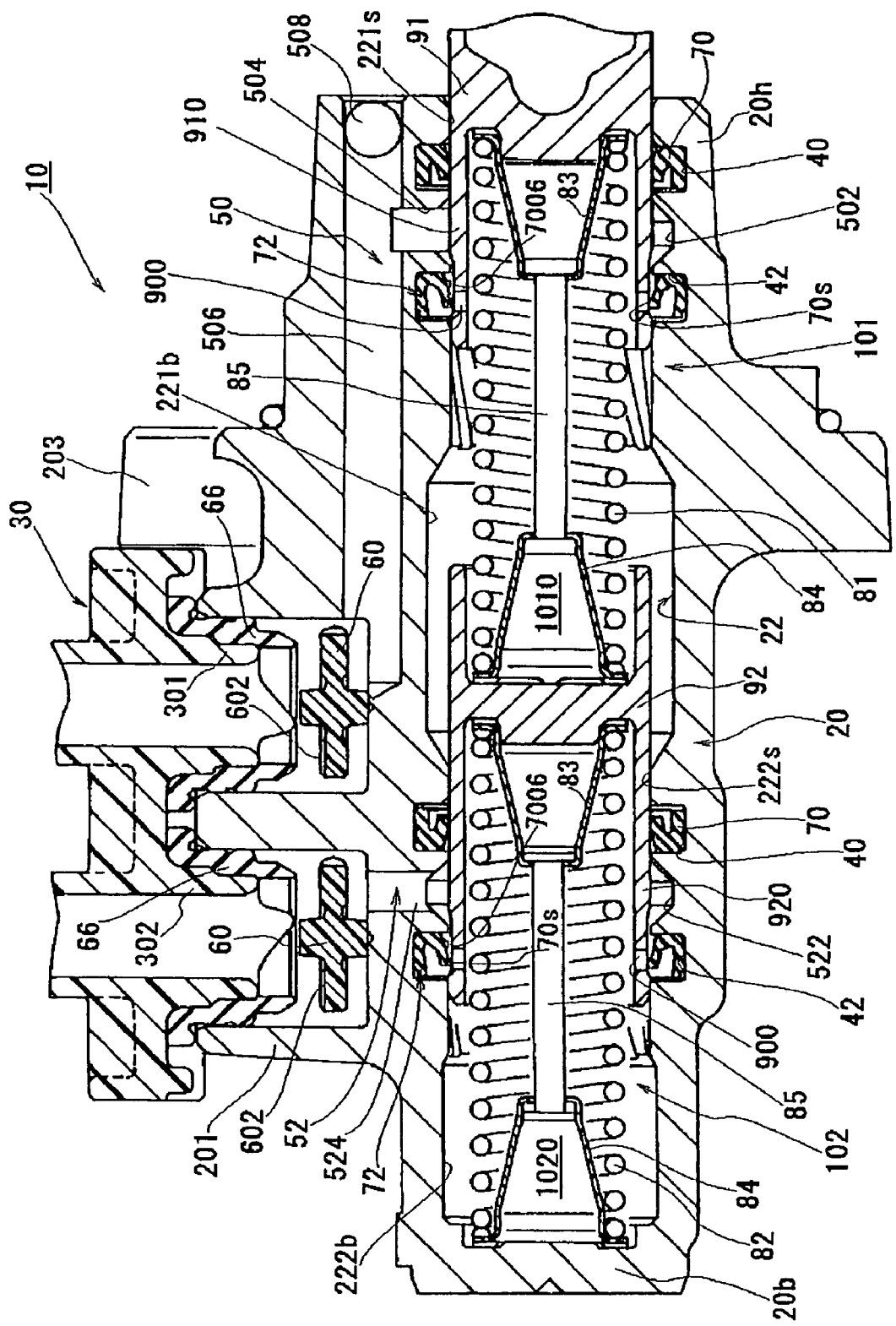
FIG. 1 is a sectional view taken on the axis of a tandem plunger type master cylinder according to one embodiment of the present invention.

FIG. 1 is one embodiment of a tandem plunger type master cylinder to which the present invention is applied. The tandem master cylinder 10 comprises a primary part 101 and a secondary part 102 which are mutually independent. In the illustrated embodiment, the way of thinking according to the present invention is applied to those two parts 101, 102.

First, referring to FIG. 1, an overall construction of the tandem master cylinder 10 is made manifest. An outer shell of the master cylinder 10 is a cylinder housing 20 made of an aluminum alloy. The cylinder housing 20 is provided at an upper part thereof with a boss part 201 for supporting a reservoir 30 and at its inside with a cylinder bore 22 axially extending from a first end part 20h which is open, to a second end part 20b which is closed. The boss part 201 is a part for supporting the reservoir 30 which reserves therein working fluid. Nipples 301, 302 of the reservoir 30 are fitted for connection to the inner side of the boss part 201. Flow passages communicated with the corresponding nipples 301, 302 are for the primary side and for the secondary side, respectively, and they are mutually independent.

When the cylinder bore 22 is axially viewed in a direction from the first end part 20h which is open, to the second end part 20b which is closed, there are sequentially provided, in order, a first reduced-diameter bore 221s which is located at an area near the first end part 20h, a first enlarged-diameter bore 221b which is located at a deep side of the first reduced-diameter bore 221s and which has a larger diameter than the first reduced-diameter bore 221s, a second reduced-diameter bore 222s which is located at even a deeper side of the first enlarged-diameter bore 221b and at an inner side of a boss part 201 and which has the same diameter as the first reduced-diameter bore 221s, and a second enlarged-diameter bore 222b which is located at the deepest side of the cylinder bore 22 and which has the same diameter as the first enlarged-diameter bore 221b. The inner parts of the first and second enlarged-diameter bores 221b, 222b each having a large diameter constitute a fluid pressure chamber. Since the component bores 221b, 222b are large in diameter, a fluid pressure chamber having a comparatively large volume can be defined while miniaturizing the cylinder housing 20. On the other hand, those parts of the first and second reduced-diameter bores 221s, 222s each having a small diameter are areas where an attachment groove for attaching a seal ring is formed and which also constitute a piston guide part for guiding the movement of a piston. Since they are located in the innermost periphery, those parts of the first and second reduced-diameter bores 221s, 222s can easily be machined and surface treated in inner peripheral wall surface, thereby ensuring them to have a mode suited for guide function. Of course, in those parts constituting the cylinder bore 22, the mutually adjacent parts are connected to each other with a taper having a comparatively gentle angle of inclination.

Should attention be paid to those parts of the first and second reduced-diameter bores 221s, 222s, those parts are provided with two seal ring attachment grooves 40, 42 which are axially arranged with a distance. Between the attachment grooves 40, 42, there is a communication passage (or passage constituting a part of it) which is in communication with the reservoir 30. A communication passage 52 of the secondary part 102 includes a ring groove 522 boring the inner periphery of the cylinder bore 22 over one round, and a through passage 524 penetrating through the wall of the cylinder housing 20 and intercommunicating the ring groove 522 and the inner side of the boss part 201. The communication passage 50 of the primary part 101 includes, in addition to the ring groove 502 and the through passage 504 as in the secondary part 102, a reservoir communication bore 506 extending parallel to the cylinder bore 22 and adapted to intercommunicate the ring groove 502 and the inner side of the boss part 201. It is a blind plug 508 that chokes the opening part on the first end part 20h side of the reservoir communication bore 506. The cylinder housing 20 surrounding the reservoir communication bore 506 is provided at an outer periphery thereof with an attachment flange 203 for attaching the master cylinder 10 to a booster (not shown). A top-like valve element 60 on the inner side of the boss part 201 is made from a resin material floating on working fluid, and it includes a throttle passage 602 on its upper surface. The valve element 60 constitutes a valve device together with a sleeve-like valve seat component element 66 which is disposed at the inner side of the boss part 201. This valve device is located at a mid-way of a passage intercommunicating a fluid pressure chamber of the master cylinder 10 and the reservoir 30 and has such a function as to communicate the passage in a cut-off state or throttling state.

The seal ring attachment grooves 40, 42 supports seal rings 70, 72 which are each composed of a cup-type seal and which are attached thereto, respectively. A secondary return spring 82, a secondary piston 92, a primary return spring 81 and a primary piston 91 are sequentially inserted in the cylinder bore 22 in order from the deep side toward the opening. By this, the secondary piston 92 defines a second fluid pressure chamber 1020 at the deep side of the cylinder bore 22 together with the seal ring 72 at the part of the second reduced-diameter bore 222s, and the primary piston 91 defines a first fluid pressure chamber 1010 between the primary piston 91 and the secondary piston 92 together with the seal ring 72 at the part of the first reduced-diameter bore

221s. The primary and secondary return springs 81, 82 are caged by a pair of spring retainers 83, 84 and a rod 85, respectively, thereby the pistons 91, 92 are prevented from jumping out of the cylinder bore 22. Although not shown, those parts of the first and second reduced-diameter bores 221s, 222s facing the fluid pressure chambers 1010, 1020, respectively, are provided with an output port for outputting a fluid pressure to a brake circuit. In order to smoothly intercommunicate the output port and the fluid pressure chambers even in the case the master cylinder 10 is in a non-operating position, a groove extending in the axial direction is preferably formed (see U.S. Pat. No. 4,524,585 for an idea for forming a groove) in an inner wall part of the cylinder bore 22 where the first and second reduced-diameter bores 221s, 222s are formed. As a groove extending in the axial direction, a helical groove is preferred.

The secondary piston 92 and the primary piston 91 include circular cylindrical parts 920, 910, respectively, each having an internal space. The circular cylindrical parts 920, 910 are each provided with a plurality of relief ports 900 penetrating through the circular cylindrical walls thereof. Each relief port 900 has a circular shape in section and is, for example, 2 mm in diameter. The numbers of the relief ports 900 are, normally, multiples of 4 (for example, 4, 8, 16 or 32), and 4 for each piston 92 (or 91) in this embodiment. Those four relief ports 900 are mutually equidistantly arranged along a circumference which is orthogonal to the axis of each piston 92 (or 91).

Figure 2:
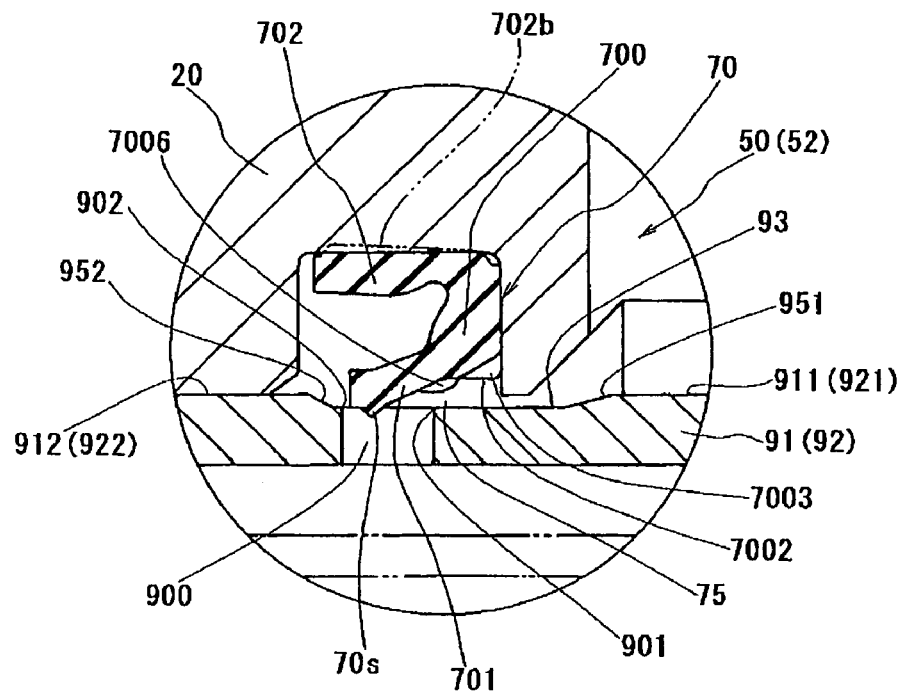
FIG. 2 is an enlarged sectional view showing the area in the vicinity of a relief port of the master cylinder of FIG. 1, in which the brake is in a non-operating position.
Figure 3:
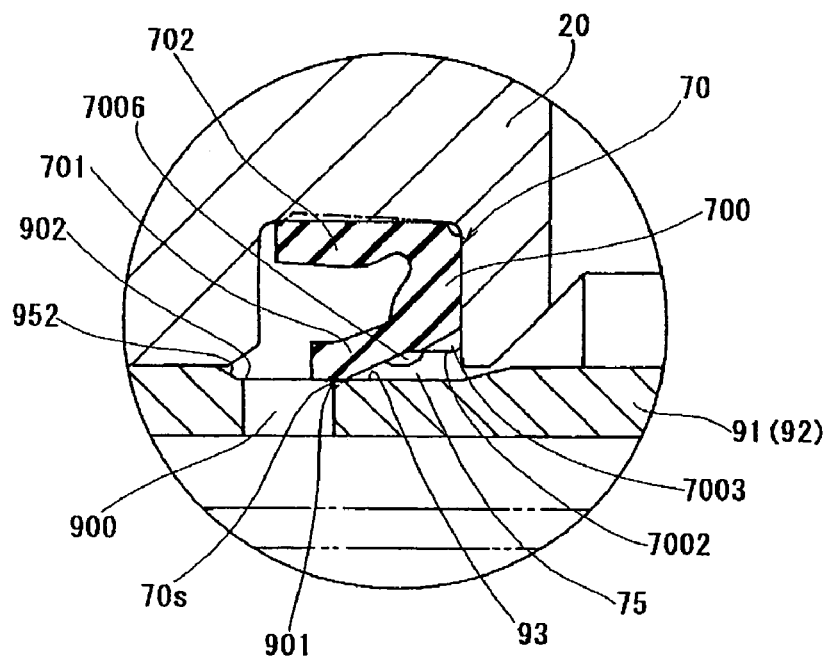
FIG. 3 is, likewise, an enlarged sectional view of the area in the vicinity of a relief port of the master cylinder of FIG. 1, showing a state in the midst of stoke in accordance with braking operation.
Figure 4:
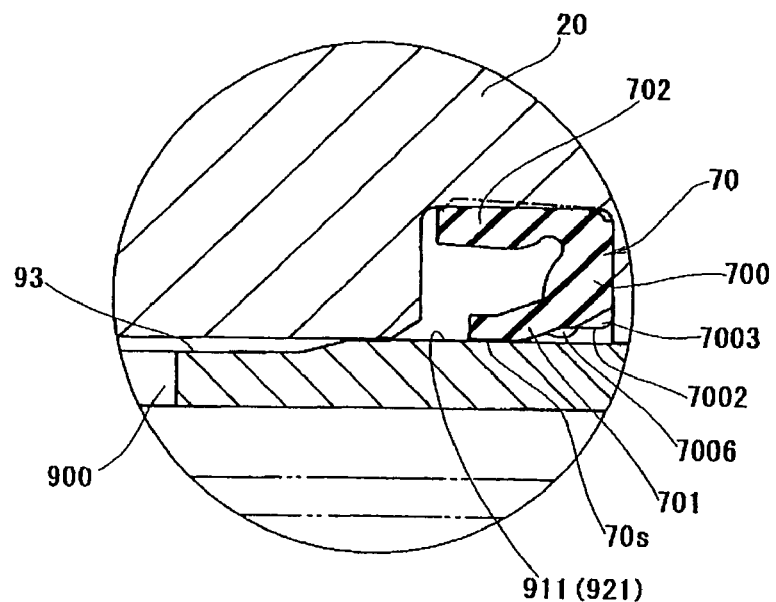
FIG. 4 is, likewise, an enlarged sectional view of the area in the vicinity of a relief port of the master cylinder of FIG. 1, showing a state of terminal end of stroke in accordance with braking operation.

The master cylinder 10 has features in construction of the area in the vicinity of the relief port 900. FIGS. 2 through 4 are enlarged views showing the area in the vicinity of the relief port 900. FIG. 2 is a view showing a state in which the brake (i.e., brake actuated by a driver) is in a non-operating position, FIG. 3 is a view showing a state in the midst of stroke in accordance with braking operation, and FIG. 4 is a view showing a state of terminal end of stroke in accordance with braking operation. The features of the master cylinder 10 will now be described with reference to FIG. 2 through 4, as well as FIG. 1.

Each piston 91 (or 92) has a ring-like recess 93 formed, over one round, in its outer peripheral surface where the relief port 900 is open. The recess 93 is, for example, about 0.2 to 0.3 mm in depth and for example, about 4 to 5 mm in axial width. The axial opposite end parts of the recess 93 are provided with tapered surfaces 951, 952, respectively, each having an angle of about 30 degrees. Through those tapered surfaces 951, 952, the bottom of the recess 93 having a small diameter and the outer peripheral parts 911, 912; 921, 922 of the pistons 91, 91 each having a large diameter are made continuous with each other comparatively smoothly. One end (i.e., the tapered surface 952 nearer to the second end part 20b side) of the recess 93 is nearer to the second end part 20b from the second edge 902 of the opening of the relief port 900. On the other hand, the other end (i.e., the tapered surface 951 nearer to the first end part 20h side) of the recess 93 is displaced by a predetermined distance to the first end part 20h from the first edge 901 of the opening of the relief port 900. The above-mentioned predetermined distance is a distance capable of intercommunicating the communication passages 50, 52 and the relief port 900 without allowing the recess 93 to increase the flow resistance. Although the recess 93 has a certain length in the axial direction, this does not mean that the diameters are reduced to the distal end parts on the second end part side 20b of the respective pistons 91, 92. The pistons 91, 92 are smoothly guided in axial movement at least at two places, namely, the distal end parts and a separate place axially away from the distal end parts passing over the recess 93. This smooth guiding also assists the effective seal coupling between the pistons 91, 92 and the seal ring 70. Since the recess 93 is disposed over the entire length in the peripheral direction of each piston 91 (or 92), the seal surface pressure in the peripheral direction of the seal ring 70 can be uniformed.

The seal ring 70 related with the relief port 900 is provided at the inner periphery of the distal end part of the inner lip 701 with a seal coupling part 70a which is seal coupled to the outer peripheral wall surface of the piston 91 (or 92). A cup-type seal ring 70 is entirely made from a rubber material, and it comprises a base part 700 which is large in thickness, and inner and outer lips 701, 702 respectively extending from the inner and outer peripheries of the base part 700 toward the fluid pressure chamber 1010 (or 1020) side. The outer lip 702 is provided at an outer periphery thereof with a tightening margin 702b, and its diameter is generally equal from the root part on the base part 700 side to the distal end part as a free end. In contrast, the inner lip 701 is smaller in diameter at the distal end part side as a free end than at the root part on the base part 700 side. Owing to this arrangement, the inner lip 701 of the seal ring 70 is inclined forward and downward from the root part toward the distal end part as a free end. Owing to this feature, the seal ring 70 defines a ring-like void 75 between the inner periphery of the inner lip 701 ranging from the seal coupling part 70s on the distal end part to the root part and the outer peripheral wall surface of the piston 91 (or 92). This void 75 functions as an intermediate communication passage for intercommunicating the relief port 900 and the communication passage 50 (or 52).

Figure 7:
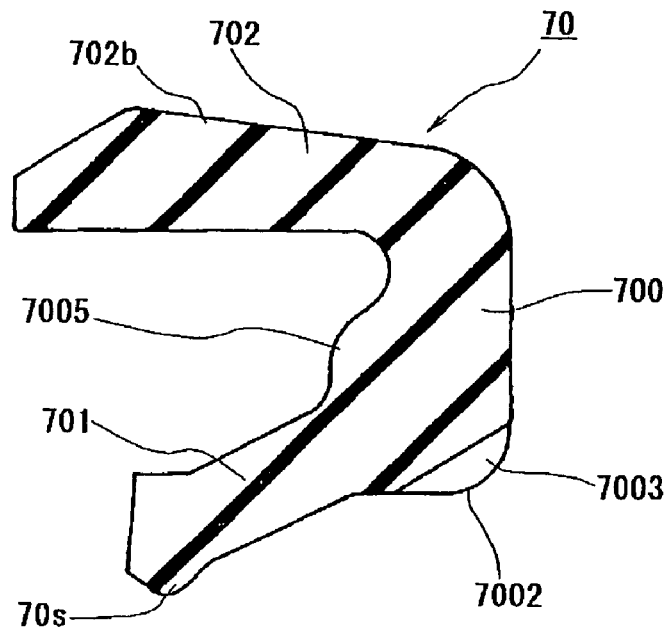
FIG. 7 is an enlarged sectional view showing a third embodiment of a seal ring employed in the present invention.

In the master cylinder 10, the seal coupling part 70s of the seal ring 70 is arranged at the opening part of the relief port 900 axially on the piston 91 (or 92) side when the master cylinder 10 is in a non-operating position (position shown in FIGS. 1 and 2). This means that the seal coupling part 70s is located between the second edge 902 and the first edge 901 of the relief port 900. In order to enlarge the void 75, the seal coupling part 70s is preferably arranged nearer to the second edge 902, and in order to minimize invalid stroke of the brake, the seal coupling part 70s is preferably arranged nearer to the first edge 901. The size of the void 75 does not have any direct effect given at the time of braking operation made by a driver (i.e., manual braking operation). However, the size of the void 75 has a direct effect to easy supply of working fluid at the time the working fluid on the reservoir 30 side is supplied to the brake circuit through the relief port 900 and the fluid pressure chamber 1010 (or 1020) under the external pump action of the master cylinder 10 when the automatic braking operation is undergoing. In order to perform the automatic braking operation smoothly, the void 75 should be set to a predetermined size or larger so that the flow resistance is reduced at the time of supplying the working fluid. The recess 93 formed in the outer periphery of the piston 90 (or 92) is very effective for effectively enlarging the void 75 and reducing the flow resistance of the working fluid. The circuit itself of the automatic brake is known as shown in FIG. 7 of Japanese Patent Application Laid-Open No. 2002-154420, for example.

The void 75 is also effective for preventing the residual pressure when the brake is in a non-operating position. It should be noted, however, that deformation, if any, of the inner lip 701 of the seal ring 70 may interfere the prevention of residual pressure. The reason is that the fluid pressure in the fluid pressure chamber 1010 (or 1020) acts on the back of the inner lip 701 facing the outer lip 702 to deform the inner lip 701 toward the first edge 901 side of the relief port 900, thereby creating a fear of reduction of the void 75.

Therefore, in the master cylinder 10, the form of the cylinder ring 70, particularly, the inner peripheral surface of the inner lip 701 facing the outer peripheral surface of the piston 91 (or 92) is applied with some elaboration. This elaboration includes an arrangement in which bulged first projection parts are disposed at a plurality of places mutually separated in the peripheral direction, thereby always obtaining an axial flow passage between every adjacent projection parts in the peripheral direction. Owing to a provision of such elaboration, there can be obtained a flow passage of working fluid on the inner periphery side of the inner lip 701 even if the inner lip 701 should be apt to stick to the outer peripheral surface of the piston 91 (or 92) when the automatic brake is actuated (that is, when the automatic brake is actuated with the seal coupling part 70s at the distal end part of the inner lip 701 located at the opening part of the relief port 900).

Figure 5A:
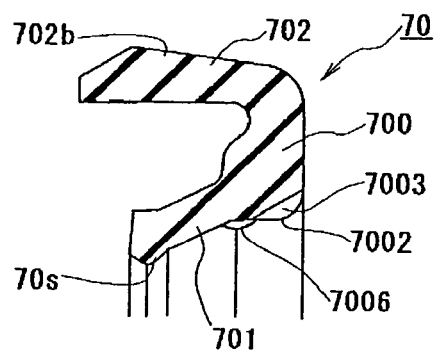
FIG. 5A is a sectional view showing a first embodiment of a seal ring employed in the present invention.
Figure 5B:
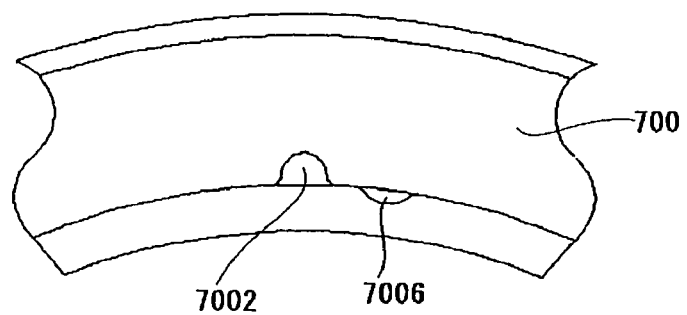
FIG. 5B is a view, as viewed in the axial direction, of the seal ring of FIG. 5A.

FIGS. 5A and 5B show an example in which a partly projecting chevron projection 7006 is used as the first projection part. Six, for example, of such chevron projections 7006 may be equidistantly arranged in the peripheral direction. Those projections 7006 is located, when viewed in the axial direction which is also the extending direction of the lip, between the root part on the base part 700 side and the seal coupling part 70s at the distal end. The root part or inner periphery on the base part 700 side is provided with second protrusion parts 7002 which are located at places, for example, six places as in the case with the projections 7006, on the corner part facing the void 75 or piston 91 (or 92) side which places are equidistantly separated in the peripheral direction, and an axial groove (flow passage) 7003 is formed between every adjacent second projection parts. In other words, the groove (flow passage) 7003 is formed by notching the corner part of the base part 700. Those grooves (flow passages) 7003 realize a flow of working fluid flowing from the relief port 900 side toward the communication passage 50 (or 52) side, together with the flow passage formed between every adjacent chevron projections 7006. Accordingly, residual pressure can be prevented from occurring. In order to surely intercommunicate the axially adjacent grooves (flow passages) 7003 and the flow passage formed between every adjacent chevron projections 7006, the second projection part 7002 on the corner part and the chevron projection 7006 disposed at its inner side may preferably displaced in the peripheral direction.

Figure 6A:
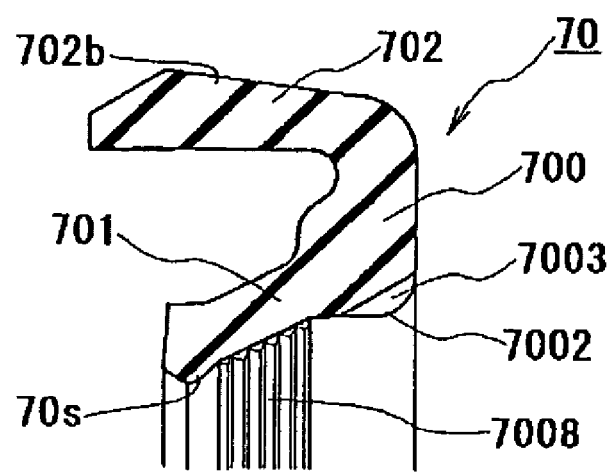
FIG. 6A is a sectional view showing a second embodiment of a seal ring employed in the present invention.
Figure 6B:
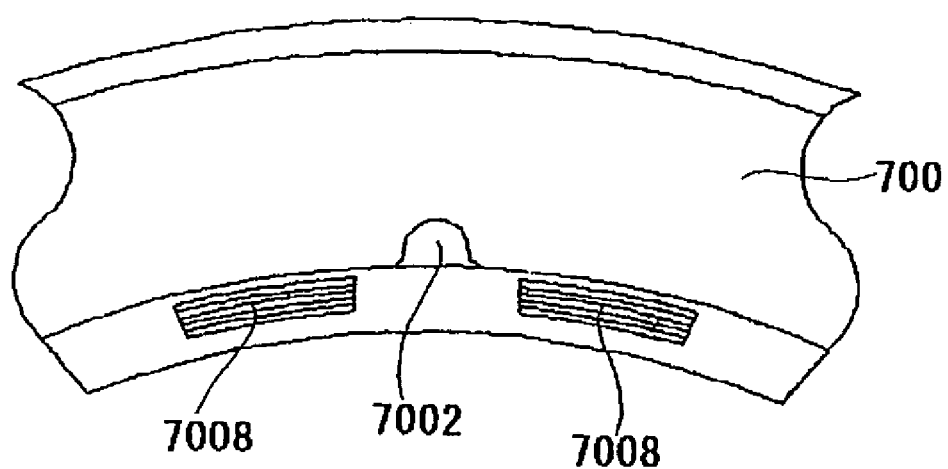
FIG. 6B is a view, as viewed in the axial direction, of the seal ring of FIG. 6A.

FIGS. 6A and 6B show another example of the first projection part, in which record groove-like regions 7008 having grooves extending in the peripheral direction and banks arranged in parallel relation with the grooves, are each used as the first projection part. Each record groove-like region 7008 is reduced in height compared with the chevron projection 7006 and its area is enlarged. In the record groove-like region 7008, it is also possible to form the axial passage as in the chevron projection 7006, so that residual pressure can effectively be prevented from occurring.

When the brake is in a non-operating position as shown in FIG. 2, the seal coupling part 70s of the seal ring 70 is located at the opening part of the relief port 900 on the piston 91 (or 92) side. When the piston 91 (or 92) is moved toward the second end part 20b side in accordance with the braking operation performed by a driver, the fluid pressure in the fluid pressure chamber 1010 (or 1020) starts to rise at the time the seal coupling part 70s reaches the first edge 901 of the relief port 900 as shown in FIG. 3. Thus, the invalid stroke is very small from the time the pressure is released when the brake is in a non-operating position to the time the fluid pressure starts to rise. Moreover, in the terminal end of stroke of the braking operation as shown in FIG. 4, the seal coupling part 70s of the seal ring 70 is located at the outer peripheral part of the piston 91 (or 92) passing over the tapered surface 951 of the recess 93. As a result, a more reliable sealing performance of the seal coupling part 70s can be obtained, and a fluid pressure, which is sufficiently high, can be generated in the fluid pressure chamber 1010 (or 1020).

When the braking operation is stopped by a driver, the piston 91 (or 92) is returned to a state of FIG. 2 under the effect of the returning force of the return spring 81 (or 82). In the returned state, the seal coupling part 70s of the seal ring 70 is brought back again into a form in which the seal coupling part 70s peeps into the inside of the opening of the relief port 900. In this returned position, i.e., in the non-operating position of the brake, the base part 700 of the seal ring 70 is brought into the attachment groove 42 and the seal coupling part 70s at the inner periphery of the distal end of the inner lip 701 is allowed to slightly project outward from the attachment groove 42. Thereafter, when braking operation is performed again by a driver, the seal coupling part 70s of the seal ring 70, as in the preceding case, rises the fluid pressure in the fluid pressure chamber 1010 (or 1020) passing over only the first edge 901 of the relief port 900. When the braking operation is stopped, the seal coupling part 70s is returned to the original state passing over only the first edge 901 (without passing over the second edge 902) of the relief port 900.

Moreover, in the master cylinder 10, other elaboration is applied to the form of the seal ring 70 in order to prevent residual pressure. FIG. 7 shows an embodiment of a free state before attachment of the seal ring 70. As previously mentioned, the seal ring 70 includes a base part 700 and an inner and an outer lip 701, 702 extending from the inner and outer peripheral parts of the base part 70 to fluid pressure chamber 1010 (or 1020). The outer lip 702 has a taper serving as the tightening margin 702b on the outer peripheral surface, while the inner lip 701 has a convex part serving as the seal coupling part 70s on the inner periphery of its distal end part. The base part 700 is provided with second protrusion parts 7002 which are located at places, for example, six places on the corner part facing the void 75 or piston 91 (or 92) side which places are equidistantly separated in the peripheral direction, and an axial groove (flow passage) 7003 is formed between every adjacent second projection parts. In other words, the groove (flow passage) 7003 is formed by notching the corner part of the base part 700. Those grooves (flow passages) 7003 smoothly intercommunicate the relief port 900 side and the communication passage 50 (or 52) side by cooperating with the voids 75 or by enlarging the voids 75.

Now, attention should be paid to the side surface of the inside (side surface on the side where the inner and outer lips 701, 702 extend) of the base part 700 of the seal ring 70. There is a swollen part 7005 over there which serves to enlarge the axial thickness of the base part 700 at the inner lip 701 side compared with at the outer lip 702 side. The swollen part 7005 occupies the entire inner periphery of the base part 700 and axially moves the center of oscillation of the inner lip 701 toward the second end part 20b compared with a case where the swollen part 7005 is not provided. For example, the axial thickness of the base part 700 is about 1 mm at its part near the outer lip 702 side, but about 1.5 mm at its part in the vicinity of the root part of the inner lip 701. Accordingly, owing to a provision of the swollen part 7005, the inner lip 701 is reduced a little more than about 0.5 mm in practical length of the lip. Moreover, owing to a provision of the integral swollen part 7005, the center of oscillation of the inner lip 701 is, when compared with a case where the integral swollen part 7005 is not provided, shifted toward the second end part 20b side and the lip is hardly deformed radially inward. Thus, the seal ring 70 having the swollen part 7005 is not greatly reduced in void 75 when it is affected by the fluid pressure variation of the surroundings, and the relief port 900 side and the communication passage 50 (or 52) are surely communicated with each other through the void 75, in a non-operating position of the master cylinder 10. Accordingly, the residual pressure can effectively be prevented from occurring. This makes it possible to eliminate one of the first and second projection parts. The swollen part 7005 is formed in the shape of a chevron in section. The swollen part 7005 may be changed in height and shape depending on hardness of the seal ring 70. What is important is that much care should be paid so as not to allow the inner lip 701 to be deformed more than necessary by the varying fluid pressure and not to overly reduce the void 75.

Figure 8:
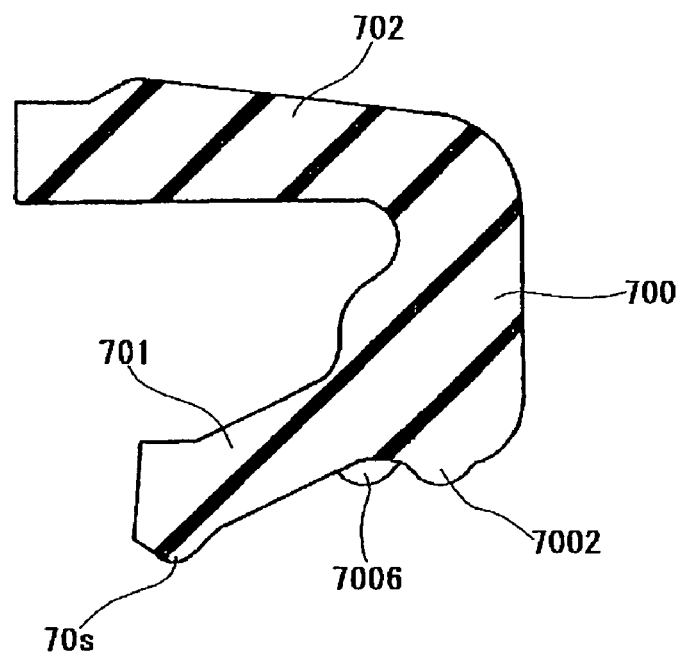
FIG. 8 is an enlarged sectional view showing a fourth embodiment of a seal ring employed in the present invention.

FIG. 8 shows still another embodiment of a seal ring which is effective for prevention of residual pressure. The first and second projection parts 7006, 7002 formed on the inner peripheral surface of the base part 700 shown in FIG. 8 are bulged such that they are generally equal in inside diameter at the base part 700. According to this embodiment, since the first and second projection parts 7006, 7002 are bulged in a dotted pattern from the surface of the base part 700, the base part 700 is not easily deformed, thus enabling to surely form a flow passage between the adjacent projection parts 7006, 7002. For example, eight pieces of the first projection parts 7006 are equidistantly arranged in the peripheral direction, and sixteen pieces of the second projection parts 7002 are equidistantly arranged in the peripheral direction. It should be noted, however, that the projection parts 7006, 7002 are preferably not mutually overlapped when viewed in the axial direction, as previously mentioned. The reason is that such an arrangement is desirable not only from the viewpoint of obtaining an effective flow passage but also from the viewpoint of shaping a seal ring.

The invention claimed is:

1. A plunger type master cylinder comprising a cylinder housing having a cylinder bore axially extending from a first end part which is open and a second end part which is closed and a communication passage which is communicated with a reservoir, a piston fitted into said cylinder bore of said cylinder housing, defining a fluid pressure chamber on the side of said second end part which is closed and axially movable, a seal ring located on the side of said cylinder housing, adapted to seal an outer periphery of said piston, and including an inner lip and an outer lip extending from a base part and an inner and an outer peripheral part of said base part to the side of said fluid pressure chamber, respectively, and a relief port serving as a passage which is located on the side of said piston and adapted to intercommunicate said communication passage and said fluid pressure chamber, an opening of said passage being located at an outer peripheral wall surface of said piston, said plunger type master cylinder having the following features;
a recess is formed on an outer peripheral surface of said piston ranging, when axially viewed, at least from a second edge on the side of said second end part of said opening of said relief port to a first edge on the side of said first end part of said opening of said relief portion, further ranging to an area away by a predetermined distance from said first edge of said opening of said relief portion toward said first end part side, and further ranging over the entire length in a peripheral direction of said piston, said inner lip of said seal ring is smaller in diameter at a distal end part as a free end thereof than at a root part on said base part side, thereby said seal ring has a seal coupling part situated at an inner periphery of the distal end part of said inner lip which is small in diameter which is seal-coupled to an outer peripheral wall surface of said piston and adapted to seal-coupled to an outer peripheral wall surface of said piston, and moreover, a void for communicating said relief portion with said communication passage together with said recess is formed between an inner periphery of said inner lip ranging from said seal coupling part to said root part, and said seal coupling part of the distal end part of said inner lip of said seal ring is axially located at the opening part of said relief port on the side of said piston when said master cylinder is in a non-operating position.

2. The master cylinder according to claim 1, wherein said seal coupling part of said inner lip of said seal ring traverses the edge of said opening of said relief port only at an area on the side of said first edge so as to be seal coupled to the outer peripheral wall surface of said piston which is nearer to said first end part from said first edge, in accordance with operation of said master cylinder.

3. The master cylinder according to claim 1 further having the following feature;
said seal ring comprises a plurality of first projection parts formed on an inner peripheral surface of said inner lip between said root part and said seal coupling part and bulged from the inner peripheral surface of said inner lip toward the outer peripheral surface of said piston, and said first protection parts are spacedly arranged in the peripheral direction, thereby forming an axial flow passage between said first projection parts which are adjacent to each other in the peripheral direction.

4. The master cylinder according to claim 3, wherein said seal ring further comprises a plurality of second projection parts located on the inner peripheral surface of said inner lip and nearer to the base part from said first projection parts, and said second projection parts are also arranged in the peripheral direction, thereby forming an axial second flow passage between said second projection parts which are adjacent to each other in the peripheral direction.

5. The master cylinder according to claim 4, wherein said first and second projection parts are arranged such that their projection parts are not overlapped with each other when viewed in the axial direction.

6. The master cylinder according to claim 1, further having the following features;
said seal ring is deformable such that said inner lip is oscillated radially inward and outward about said root part, said base part, said base part is provided at an inside surface on the side where said inner and outer lips extend with a swollen part for enlarging the axial thickness of said base part on the inner lip side compared with the outer lip side, and the center of oscillation of said inner lip is located in a position nearer to the second end part side in the axial direction than in a case where no swollen part is provided.

7. The master cylinder according to claim 1, wherein said seal coupling part is composed of an convex part which is formed over the entire periphery of the distal end part of said inner lip.

8. The master cylinder according to claim 1, wherein the outer peripheral wall surface of said piston to which said seal coupling part is seal coupled, is located between a part situated in said recess formed in the outer periphery of said piston and a part nearer to said first end part from said recess.

9. The master cylinder according to claim 1, wherein said cylinder housing is provided, when viewed in the axial direction, at a front and a rear part of said recess formed in said piston with portions for guiding movement of said piston.

10. The master cylinder according to claim 1, wherein an attachment groove for attaching said seal ring is formed in an inner peripheral wall surface of said cylinder bore of said cylinder housing, and said seal ring is located in said attachment groove with said base part sunk in said attachment groove and with said seal coupling part at the inner periphery of the distal end part of said inner lip projecting outward from said attachment groove.

* * * * *